United States Patent
Siddiqui et al.

(10) Patent No.: US 10,965,056 B2
(45) Date of Patent: Mar. 30, 2021

(54) PHASE TERMINAL INTERFACE

(71) Applicant: FORD GLOBAL TECHNOLOGIES, LLC, Dearborn, MI (US)

(72) Inventors: Siraj Siddiqui, Lasalle (CA); Casey Taylor Dunn, Brownstown Charter Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 21 days.

(21) Appl. No.: 16/414,284

(22) Filed: May 16, 2019

(65) Prior Publication Data

US 2020/0366026 A1 Nov. 19, 2020

(51) Int. Cl.
*H01R 13/52* (2006.01)
*H01R 9/24* (2006.01)
*H02K 1/12* (2006.01)

(52) U.S. Cl.
CPC ......... *H01R 13/521* (2013.01); *H01R 9/2491* (2013.01); *H01R 13/5202* (2013.01); *H02K 1/12* (2013.01)

(58) Field of Classification Search
CPC .......... H02K 1/12; H02K 11/00; H02K 11/30; H02K 11/33; H01R 9/2491; H01R 13/5202; H01R 13/521
USPC .............................................. 310/66, 71, 89
See application file for complete search history.

(56) References Cited

U.S. PATENT DOCUMENTS

| | | | |
|---|---|---|---|
| 5,762,526 A | 6/1998 | Kuramoto et al. | |
| 7,530,843 B1* | 5/2009 | Tesfay | H01R 13/521 439/587 |
| 8,905,784 B2* | 12/2014 | Perotto | H05K 5/069 439/606 |
| 2008/0088190 A1* | 4/2008 | Ideshio | H02K 5/225 310/71 |
| 2015/0280354 A1* | 10/2015 | Rangi | H01R 13/521 439/587 |
| 2017/0149166 A1* | 5/2017 | Mann | H01R 13/5202 |
| 2019/0222091 A1* | 7/2019 | Degner | H02K 3/24 |

FOREIGN PATENT DOCUMENTS

JP 2015115240 6/2015

* cited by examiner

*Primary Examiner* — Tulsidas C Patel
*Assistant Examiner* — Rashad H Johnson
(74) *Attorney, Agent, or Firm* — David B. Kelley; Brooks Kushman P.C.

(57) ABSTRACT

An e-machine is disclosed that comprises a stator, a terminal block, and a plurality of interface conductors. The stator is disposed inside a housing in a wet portion of the housing that contains transmission fluid. The terminal block is attached to the housing and is electrically connected to an inverter system controller of the e-machine. The terminal block is disposed in a dry portion of the housing that does not contain transmission fluid. The plurality of interface conductors each include a hollow conductive body, a stator lead lug on a first end connected to windings of the stator, and a busbar on a second end connected to the terminal block. A seal is assembled at an intermediate location in a groove on an outer surface of the hollow conductive body. A plug is assembled inside the hollow conductive body.

19 Claims, 3 Drawing Sheets

PHASE TERMINAL INTERFACE

TECHNICAL FIELD

This disclosure relates to for an electric machine phase terminal assembly that interfaces between terminal block busbars and stator leads.

BACKGROUND

Electric Vehicles (EVs) and Hybrid Electric Vehicles (HEVs) are being developed with a goal of improving fuel efficiency. The above vehicles have at least one electric machine, or e-machine, that provides torque to drive the vehicle and functions as a generator for charging one or more batteries and provides energy for powering electrical accessories. Electric machines may have phase terminals that are connected to a stator assembly inside a housing of the e-machine. The phase terminals are attached to a terminal block outside the housing of the e-machine.

SUMMARY

E-machines have phase terminals that are part of the stator assembly. Phase terminals are attached to a terminal block in a dry environment and a stator of the e-machine that is disposed in a wet environment containing transmission fluid. Phase lead wires of the stator are connected to the phase terminals on a first side of the phase terminal assembly. Busbars of the phase terminal assembly are fastened to lugs on a second side of a terminal block. The e-machine has a housing containing transmission fluid. The phase terminals are sealed to prevent leakage of the transmission fluid from the housing. The phase terminals maintain a robust conductive path through the e-machine housing at a reasonable cost.

According to one aspect of this disclosure, a stator interface assembly is disclosed for an e-machine. The e-machine includes an integral conductor including a tubular body having a stator lead lug on a first end of the tubular body, and a busbar on a second end of the tubular body. The stator lead lug is configured to be connected to a stator of the e-machine. The busbar is configured to be connected to a terminal block of the e-machine. A seal is assembled in a circumferential orientation around the tubular body at an intermediate location on an outer surface of the tubular body. The seal forms a seal with an opening defined by a housing of the e-machine. A plug seal is assembled inside the tubular body that is configured to prevent liquid from passing through the tubular body from the first end to the second end of the tubular body.

An e-machine is disclosed that comprises a stator, a terminal block, and a plurality of connectors. The stator is disposed inside a housing in a wet portion of the housing that contains transmission fluid. The terminal block is attached to the housing and is operatively connected to an inverter system controller for the e-machine. The terminal block is disposed in a dry portion of the housing that does not contain transmission fluid. The plurality of interface conductors each include a hollow conductive body, a stator lead lug on a first end connected to the stator, and a busbar on a second end connected to the terminal block. A seal is assembled at an intermediate location on an outer surface of the hollow conductive body. A plug is assembled inside the hollow conductive body.

According to another aspect of this disclosure, an electric vehicle is disclosed that has an e-machine for providing torque in a driving mode and for recovering energy in a regenerative mode, the e-machine having a stator disposed in a transmission housing that is controlled by an inverter system controller that is disposed outside the transmission housing. A conductor passes through an opening in the transmission housing to connect the stator to the terminal block. The conductor has a tubular body including an inner end that is disposed within the transmission housing and an outer end that is disposed outside the transmission housing. A stator lead lug is provided on the inner end of the conductor and is adapted to be connected to the stator by lead wires. A busbar is provided on the outer end of the conductor and is adapted to be connected to the terminal block. The terminal block is connected to the inverter system controller that controls the operation of the e-machine.

The above aspects of this disclosure and other aspects will be described below with reference to the attached drawings.

DETAILED DESCRIPTION

Figure 1:
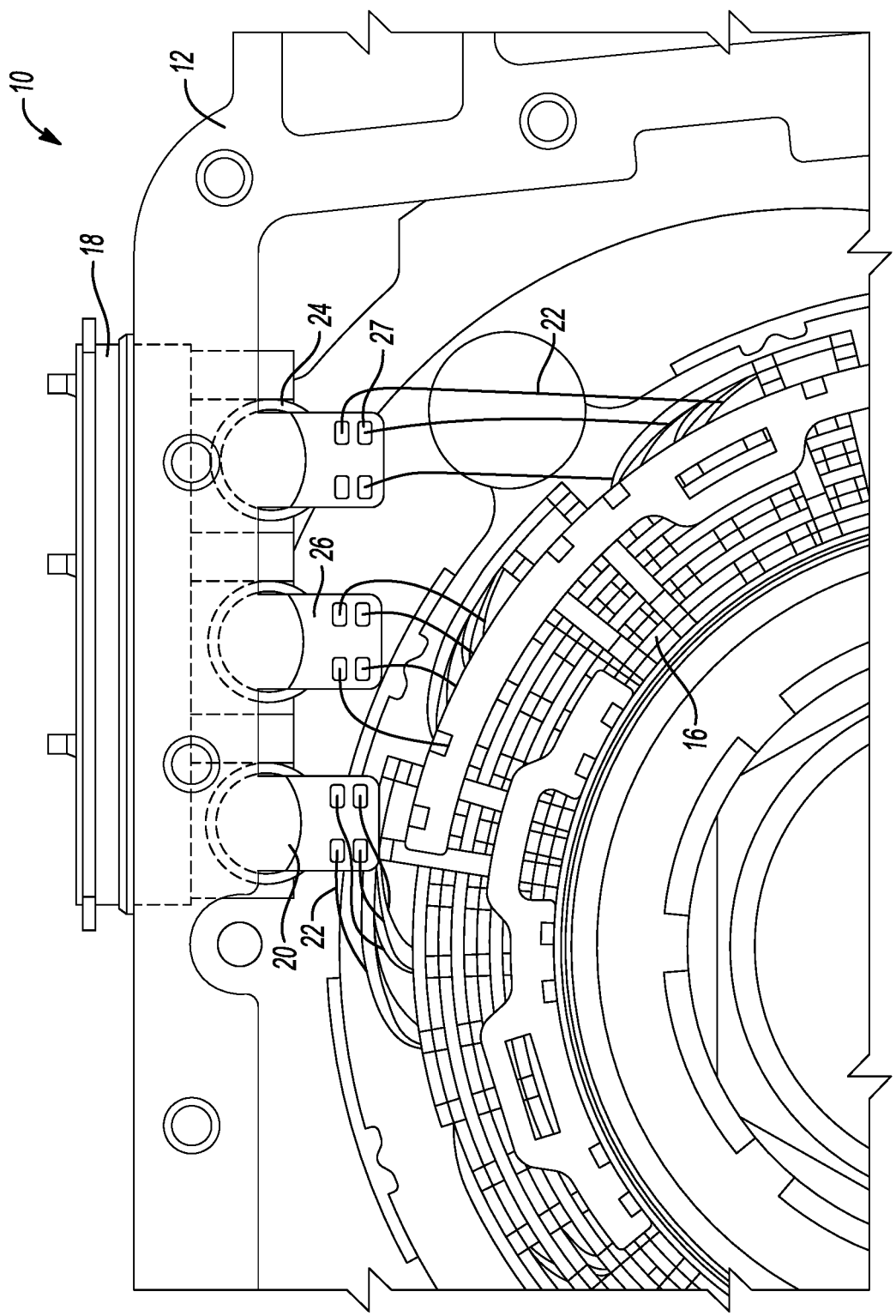
FIG. 1 is a fragmentary diagrammatic view of part of a stator of an e-machine of a hybrid vehicle.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

E-machines used for electric vehicles include a motor that has a stator assembly. The stator assembly may have multiple phase power, for example, the e-machine may be powered by three phase power and may produce three phase power used to charge a high voltage battery. The phase terminals are part of the stator assembly and are mounted to a terminal block.

The e-machine includes a housing that encloses the stator assembly. The housing also contains transmission fluid that maintains a "wet" environment for the stator assembly. Conductors are used to transmit power between the phase terminal block and the stator. Lead wires are connected to the stator assembly and terminals provided on the inside of the housing on one end of the conductors. Fasteners may be provided for connecting bus bars on the outer side of the housing to the terminal block disposed on the outside of the housing. The terminal block is connected to the inverter system control that controls the operation of the stator assembly of the e-machine.

The conductors, terminals, and busbars may be constructed as an integral part in one piece from metal having excellent conductivity. By forming the conductors, terminals, and busbars as an integral part cost savings may be achieved because labor costs for assembling the terminals and busbars to the conductor are not incurred. The conductors may be hollow, cylindrical tubular members that have excellent conductive properties. The terminals and busbars may be formed as extensions of the cylindrical walls on opposite ends of the cylindrical tubular members.

The conductors extend through the housing of the e-machine but the transmission fluid in the inside of the housing must be prevented from leaking out of the housing. The structure of the cylindrical tubular members defines potential internal and an external leak paths that must be adequately sealed. The external surface defines a first leak path where the cylindrical tubular members contact an opening through the wall of the housing. The first leak path may be sealed by an O-ring seal attached to the external surface of the cylindrical tubular member. The internal surface defines a second leak path through the inside of the cylindrical tubular members. The second leak path may be sealed with a plug seal that blocks fluid flow through the opening defined by the hollow, cylindrical tubular members. One non-limiting example of such a plug seal is a Welch plug that is pressed inside the hollow tubular member and contacts the inner surface of the tubular member.

The conductors may include a groove in the outer surface that is manifested on the internal surface as a ridge. The groove in the outer surface and ridge on the inner surface may be formed by swaging a circumferential ring area on the tubular body. The groove in the outer surface is adapted to partially receive the O-ring with a portion of the O-ring extending outwardly and into contact with the opening for the conductors in the housing of the e-machine. The ridge on the internal surface is adapted to be engaged by the plug seal and is used to positively locate the plug seal inside the tubular member.

Referring to FIG. 1, an e-machine 10 is partially illustrated that includes a transmission housing 12 and a stator 16 of the e-machine. As used herein, the e-machine 10 is the traction motor for the vehicle and also functions to regeneratively charge the battery of the vehicle. The transmission housing 12 encloses the stator 16 that is on the "wet" side of the housing 12 that contains transmission fluid. A terminal block 18 is provided on the "dry" side of the housing 12. The stator 16 is connected to an interface conductor 20 by electrical phase conducting wires 22.

Figure 2:
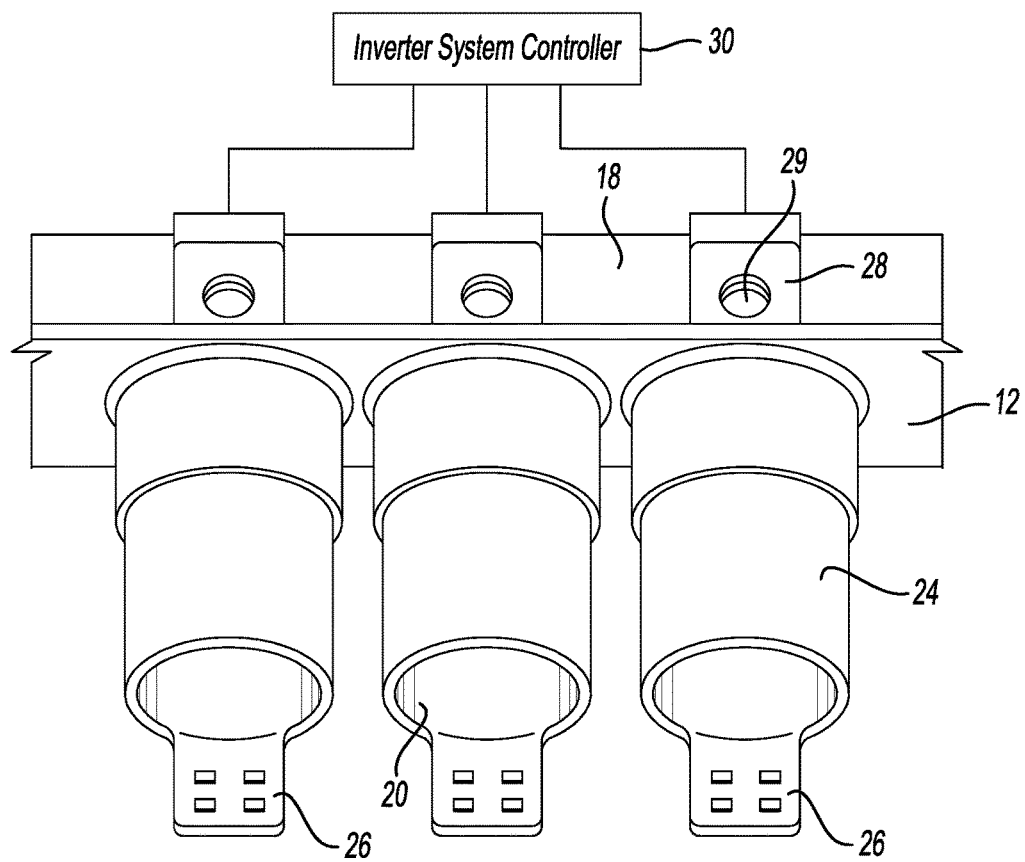
FIG. 2 is a fragmentary top perspective view of three interface conductors installed in a housing of an e-machine.

As shown in FIGS. 1 and 2, a plurality of interface conductors 20 are assembled to the transmission housing 12. The interface conductors 20 include a hollow conductive body 24. A stator lead lug 26 is provided on the body 24 and is adapted to be installed in the housing 12 on the "wet" side of the housing 12. The stator lead lug 26 may be formed as an axial extension from the cylindrical side wall of the hollow conductive body 24. The stator lead lug 26 may be formed to be offset from the conductive body into a convenient location for attachment to the lead wires 22 of the stator. The wires 22 may be connected to the stator 16 by soldering or laser welding.

The stator lead lug 26 extends axially from an inner end of the hollow conductive body 24 and as shown is formed to be radially recessed relative to the hollow conductive body 24. The stator lead lug 26 includes a planar area at the distal end thereof and may include four holes 27, or slots, that are adapted to receive the lead wires 22.

A busbar 28 is provided on the opposite end of the interface conductor 20 that is adapted to be attached to the terminal block 18. The busbar 28 may be formed as an axial extension of the cylindrical side wall of the hollow conductive body 24. The stator lead lug 26 and the busbar 28 extend in opposite axial directions form the hollow conductive body 24.

The busbar 28 extends axially from an outer end of the hollow conductive body 24 and, as illustrated, is formed to be radially recessed relative to the hollow conductive body 24. The bus bar defines a fastener receiving hole 29 in a planar portion thereof. The fastener receiving hole 29 receives a fastener (not shown) that secures the busbar 28 to the terminal block 18.

The e-machine 10 is controlled by an inverter system controller 30 that is interfaced with the terminal block 18. Three phase power is provided to the stator 16 (shown in FIG. 1) that is controlled by the inverter system controller 30 to provide torque to the vehicle's wheels. When the e-machine is in a regenerative mode, three phase power is provided through the inverter system controller to the high voltage, or traction, battery (not shown).

Figure 3:
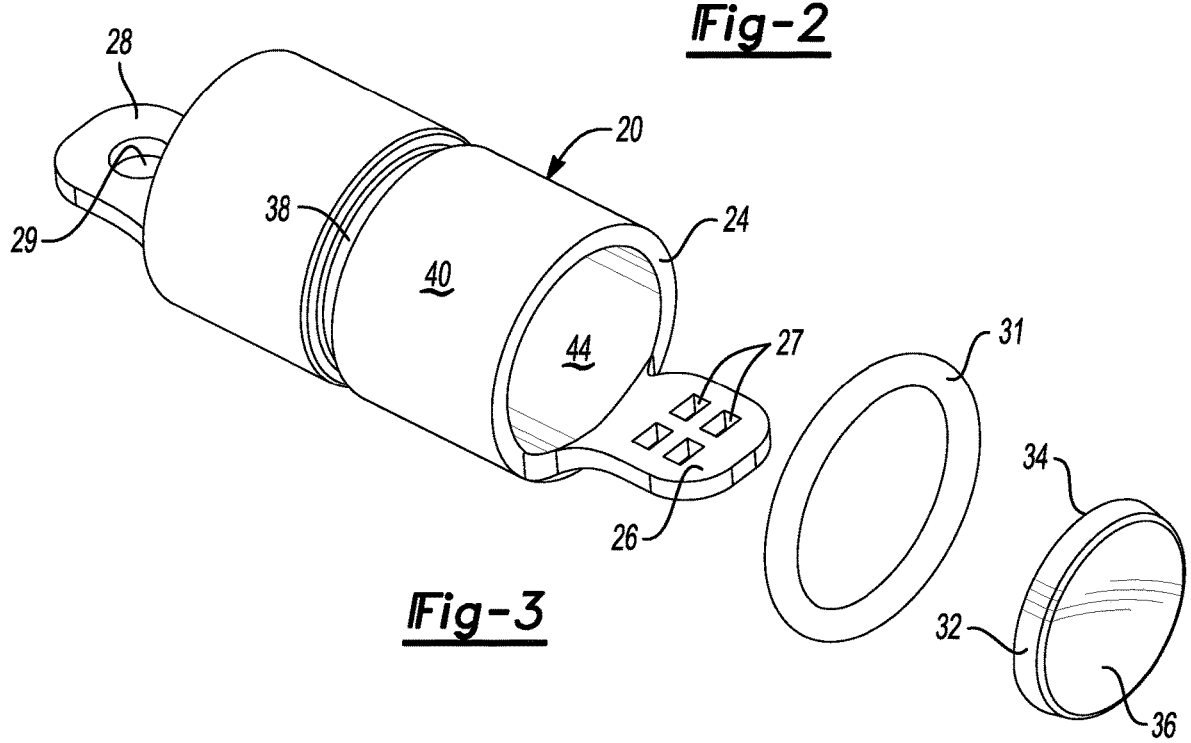
FIG. 3 is an exploded perspective view of an interface conductor, an O-ring seal and a plug seal.

Referring to FIG. 3, the interface conductor 20 is illustrated with an O-ring seal 31 and a disc-shaped core plug 32. The interface conductor 20 includes the hollow conductive body 24 that is generally cylindrical in shape. While the O-ring seal 31 is illustrated other types of seals that can establish a seal between the interface conductor and the housing may be substituted for the O-ring seal 31. The disc-shaped core plug 32 may by of the type that may be referred to as a Welch plug which is a dome-shaped plug having a convex side 34 and a concave side 36. The disc-shaped core plug 32 is inserted into the interface conductor 20 with the convex side facing the busbar on the dry side of the housing 12.

A circumferential recess 38, or groove, is formed in the outer surface 40 of the interface conductor 20. The O-ring seal 31 is assembled into the circumferential recess 38 that functions to locate and retain the O-ring seal 31. An internal ridge 42 (shown in FIG. 6) extends radially inwardly from the inner surface 44 of the interface conductor 20 when the circumferential recess 38 is formed by a roll-forming or swaging process.

Figure 4:
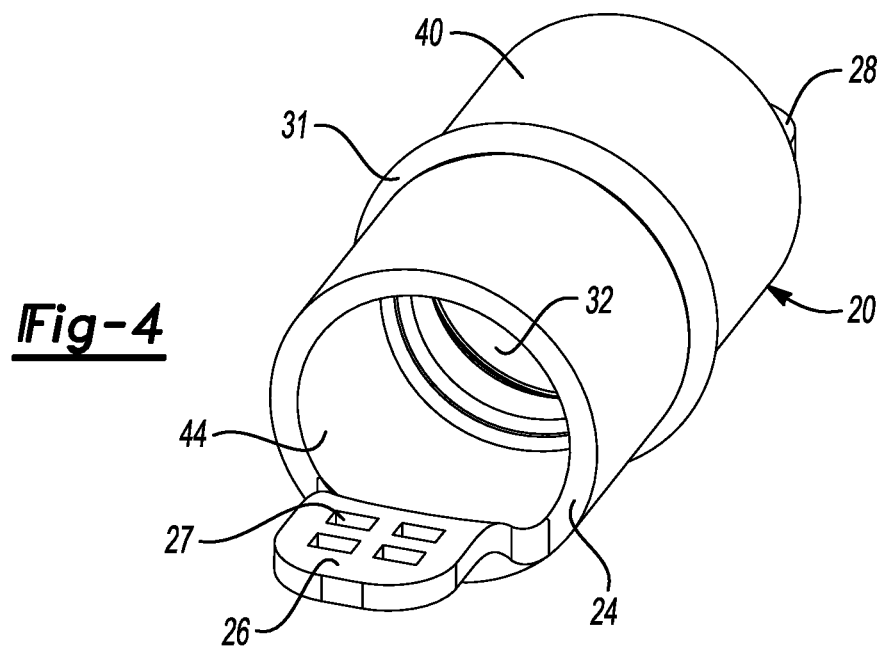
FIG. 4 is a perspective view of an interface conductor.

Referring to FIG. 4, the interface conductor 20 is shown with the O-ring seal 31 attached to the outer surface 40 of the hollow tubular member 24. The core plug 32 is shown assembled to the inner surface 44 of the hollow tubular member 24. The O-ring seal 31 is received in the circumferential groove 38 formed in the hollow tubular member 24 and extends radially outwardly from the outer surface 40. The core plug 32 is inserted into the interface conductor 20 to seal the opening in the hollow tubular member 24. The core plug 32 is pressed into the hollow tubular member 24 until the core plug 32 contacts the internal ridge 42 on the inner surface 44 of the hollow tubular member 24.

Figure 5:
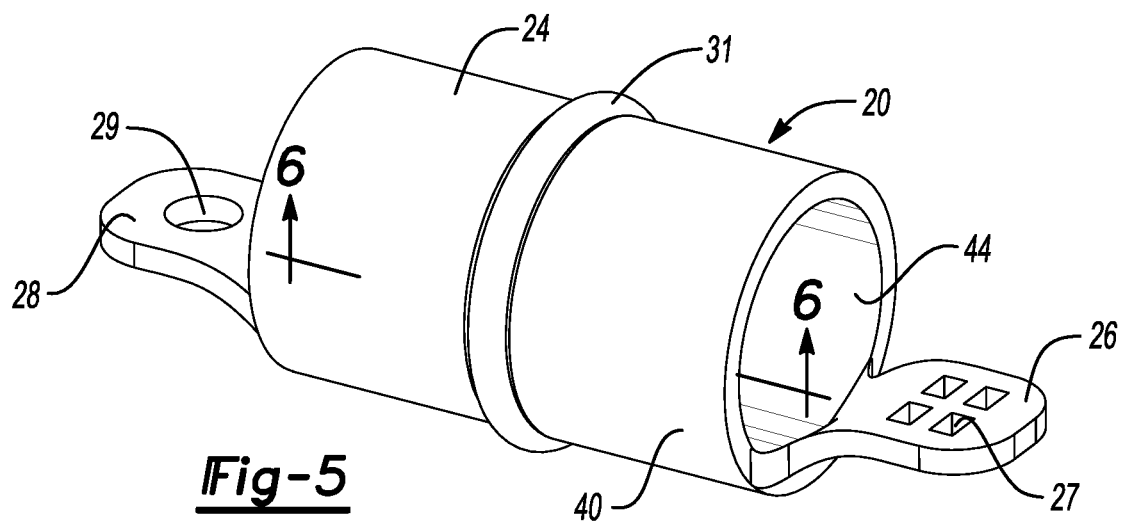
FIG. 5 is a perspective view of an interface conductor.

Referring to FIG. 5, the interface conductor 20 is shown to include the hollow tubular member 24. The hollow tubular member 24 has an external, or outer, surface and an internal surface 44. The stator lead lug 26 extends axially from the hollow conductive body 24 and is offset from the conductive body 24. The lead wires 22 (shown in FIG. 1) connect the stator to the interface conductor 20. The stator lead lug 26 is radially recessed relative to the hollow conductive body 24 to facilitate insertion and removal of the interface conductor 20 in the housing 12. On the opposite end of the hollow tubular member 24, the busbar 28 is provided that defines the fastener receiving opening.

Figure 6:
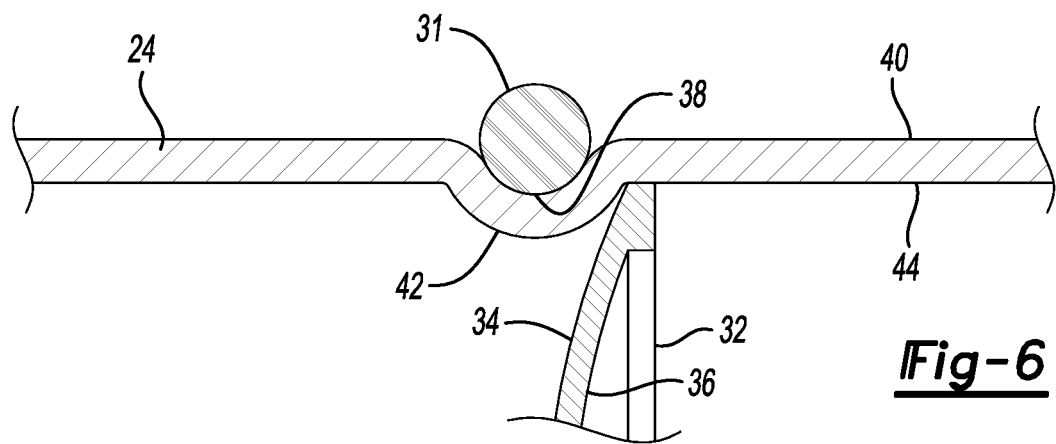
FIG. 6 is a cross-section view taken along the line 6-6 in FIG. 5.

Referring to FIG. 6, the relative location of the O-ring seal 31, core plug 32, the circumferential recess 38 and internal ridge 42 is illustrated in cross-section. The O-ring seal 31 is partially retained in the recess 38 and a portion of the O-ring seal 31 projects radially outwardly from the outer surface 40 of the hollow tubular body to bear against transmission housing 12. The core plug 32 is shown after being inserted into the hollow tubular member 24. The core plug 32 is pressed into the hollow tubular member 24 until the core plug 32 is located adjacent to and in contact with the internal ridge 42.

In an alternative embodiment, the hollow tubular member 24, the stator lead lug 26, and the busbar 28 could be formed as separate pieces. The hollow tubular member could be formed as a cylindrical tube with ends being simply cut-off in radially extending planes on opposite ends of the hollow tubular member 24. The busbar 28 may then be separately formed and joined to the hollow tubular member 24 by welding. Similarly, the stator lead lug 26 may be separately formed and joined to the hollow tubular member 24 by welding. While this approach requires several additional manufacturing steps and additional labor, the efficacy of the interface conductor 20 is expected to be equivalent to the integral interface conductor as described with reference to FIGS. 2-6.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for applications.

What is claimed is:

1. A stator interface assembly for an e-machine comprising:
    a conductor including a tubular body having an integral stator lead lug on a first end of the tubular body, and an integral busbar on a second end of the tubular body, wherein the stator lead lug is configured to be connected to a stator of the e-machine, and the busbar is configured to be connected to a terminal block of the e-machine;
    a seal assembled in a circumferential orientation around the tubular body at an intermediate location on an outer surface of the tubular body, wherein the seal forms a seal with an opening defined by a housing of the e-machine; and
    a plug seal assembled inside the tubular body that is configured to prevent liquid from passing through the tubular body from the first end to the second end of the tubular body, wherein the plug seal is a disc-shaped plug press-fit inside the tubular body of the conductor and contacts an internal ridge that extends radially inwardly from an internal surface of the tubular body.

2. The stator interface assembly of claim 1 wherein the plug seal is domed metallic disc that is pressed with a convex side facing the second end.

3. The stator interface assembly of claim 1 wherein the tubular body defines an annular recess at the intermediate location.

4. The stator interface assembly of claim 1 wherein the seal is an O-ring.

5. The stator interface assembly of claim 1 wherein the tubular body, the stator lead lug, and the busbar are integral.

6. The stator interface assembly of claim 1 wherein the tubular body is cylindrical.

7. The stator interface assembly of claim 1 wherein the tubular body, the stator lead lug, and the busbar are copper.

8. An e-machine comprising:
    a stator disposed inside a housing in a wet portion of the housing that contains transmission fluid;
    a terminal block attached to the housing and operatively connected to an inverter system controller for the e-machine, wherein the terminal block is disposed in a dry portion of the housing that does not contain transmission fluid;
    a plurality of interface conductors each including a hollow conductive body, a stator lead lug on a first end of the hollow conductive body connected to the stator, and a busbar on a second end of the hollow conductive body connected to the terminal block;
    a seal assembled circumferentially around an outer surface of the hollow conductive body; and
    a plug assembled inside the hollow conductive body and configured to prevent fluid from flowing through the hollow conductive body from the first end to the second end.

9. The e-machine of claim 8 wherein the plug is a disc-shaped plug press-fit inside the hollow conductive body of each of the interface conductors.

10. The e-machine of claim 8 wherein the plug is domed metallic disc that is pressed with a convex side facing the second end.

11. The e-machine of claim 8 further comprising:
    a ridge extending radially inwardly from an inner surface of the interface conductor.

12. The e-machine of claim 8 wherein the hollow conductive body defines an annular recess at an intermediate location on an outer surface of the hollow conductive body.

13. The e-machine of claim 8 wherein the seal is an O-ring.

14. The e-machine of claim 8 wherein the hollow conductive body, the stator lead lug, and a busbar are integral.

15. The e-machine of claim 8 wherein the hollow conductive body is cylindrical.

16. The e-machine of claim 8 wherein the hollow conductive body, the stator lead lug, and the busbar are copper.

17. An electric vehicle having an e-machine for providing torque in a driving mode and for recovering energy in a regenerative mode, the e-machine having a stator disposed in a transmission housing that is controlled by an inverter system controller that is disposed outside the transmission housing comprising:
    a conductor having tubular body including an inner end disposed within the transmission housing and an outer end disposed outside the transmission housing, wherein the conductor passes through an opening in the transmission housing;

a stator lead lug provided on the inner end of the conductor that is adapted to be connected to the stator by lead wires; and a busbar provided on the outer end of the conductor that is adapted to be connected to a terminal block, wherein the terminal block is connected to the inverter system controller that controls operation of the e-machine.

18. The electric vehicle of claim 17 further comprising:

a seal assembled in a circumferential orientation around an outer surface of the tubular body, wherein the seal forms a seal with an opening defined by a housing of the e-machine.

19. The electric vehicle of claim 17 further comprising:

a plug seal assembled inside the tubular body that is configured to prevent liquid from passing through the tubular body from the inner end to the outer end of the tubular body.

* * * * *